United States Patent [19]

Jaggar

[11] Patent Number: 5,749,094
[45] Date of Patent: May 5, 1998

[54] INVALID WRITE RECOVERY APPARATUS AND METHOD WITHIN CACHE MEMORY

[75] Inventor: David Vivian Jaggar, Cherry Hinton, United Kingdom

[73] Assignee: Advanced Risc Machines Limited, Cambridge, United Kingdom

[21] Appl. No.: 747,196

[22] Filed: Nov. 12, 1996

Related U.S. Application Data

[63] Continuation of Ser. No. 301,482, Sep. 7, 1994, abandoned.

[30] Foreign Application Priority Data

Sep. 29, 1993 [GB] United Kingdom ............... 9320143

[51] Int. Cl.$^6$ ........................................... G06F 12/12
[52] U.S. Cl. ............................... 711/139; 711/135
[58] Field of Search ........................ 395/466, 468, 395/471, 473, 462; 711/135, 139, 141, 144, 146, 145, 143

[56] References Cited

U.S. PATENT DOCUMENTS

| | | | |
|---|---|---|---|
| 5,226,133 | 7/1993 | Taylor et al. | 711/207 |
| 5,325,499 | 6/1994 | Kummer et al. | 711/143 |
| 5,408,636 | 4/1995 | Santeler et al. | 711/163 |

FOREIGN PATENT DOCUMENTS 0 210 384 A1  2/1987  European Pat. Off. .

OTHER PUBLICATIONS

Intel, "Intel DX4 Processor Data Book," Feb. 1994, pp. 8–22 & 8–24, 6–1 to 6–2.
Fu et al., "Performance and Microarchitecture of the i486™ Processor", 1989, IEEE, pp. 182–187.
Miyake et al., "A 40 MIPS (Peak) 64-bit Microprocessor with One-Clock Physical Cache Load/Store", 1990, IEEE, pp. 42–43, 261.
Safai, M., and Stodieck, R., "Complete High-Performance Cache System for the 80386", Microprocessors and Microsystems, vol. 14, No. 10, Dec. 1990, pp. 664–674.

*Primary Examiner*—Eddie P. Chan
*Assistant Examiner*—Kevin L. Ellis
*Attorney, Agent, or Firm*—Fenwick & West LLP

[57] ABSTRACT

A data processing system is described having a central processing unit (CPU) 4, a memory management unit (MMU) 6 and a cache memory 8. The CPU 4 makes cache writes in the same clock cycle that the data is output from the CPU 4. In a following clock cycle, the MMU 6 produces a signal IC indicating whether that storage operation was invalid. If the storage operation was invalid, then a flag associated with a cache storage line storing a plurality of output data words is set to indicate such invalid storage.

8 Claims, 3 Drawing Sheets

5,749,094

INVALID WRITE RECOVERY APPARATUS AND METHOD WITHIN CACHE MEMORY

This is a continuation of application Ser. No. 08/301,482 filed on Sep. 7, 1994, now abandoned.

BACKGROUND OF THE INVENTION

1. Field of the Invention

This invention relates to data processing apparatus and methods. More particularly, this invention relates to data processing apparatus and methods utilising cache storage.

2. Description of the Prior Art

It is known to provide data processing systems having high speed cache storage to improve the overall system performance. The cache storage trades storage capacity against access speed to provide data read and write capabilities of high speed with a relatively low capacity. The relatively low capacity of the cache storage often has the result that the particular data word the system may want to read or write is not present within the cache. This then requires a lower speed access to the other storage systems.

The control of writing and reading to the cache storage is usually handled by a cache tag unit that stores the data addresses of the data words currently stored within the cache storage. The address of the data to be accessed is compared with the addresses stored in the cache tag unit and if a match ("hit") occurs then the access is enabled to the main cache storage.

It will be appreciated that the time taken to make a cache access operation is often critical in determining the overall performance of a data processing system. In many cases, it is the cache access time that is a limiting factor in the system performance.

A complicating factor within such systems results from the increased use of multi-tasking and object oriented programming methods in which it is important for data integrity purposes that the ability to modify particular data is limited to particular processing threads or objects. In such situations, it is important to provide a mechanism for controlling write storage operations that is able to deal with invalid storage operations, e.g. storage operations relating to data words to which a particular processing thread or object should not have write access.

It is known in data processing systems such as the ARM600 produced by Advanced RISC Machines Limited to provide a hardware memory management unit (MMU) as part of an integrated circuit. This MMU (or memory management means) controls the access allowed to different portions of the storage within the system. The MMU is distinct from the central processing unit (CPU) and cache and serves the function of controlling access permission rather than determining whether a cache hit has occurred, that being the function of the cache TAG unit. Whilst such a hardware based approach has a sufficiently high speed of operation to not impact the performance of storage operations to storage media such as standard DRAM or a hard disc drive, in the highly speed critical path to cache storage, the time taken for the MMU to return a signal indicative of whether a particular storage operation is invalid becomes a limiting factor in system performance.

More particularly, it is possible to provide a central processing unit (CPU) and cache memory in which an output data word generated by the CPU can be stored by the cache memory within the same clock period that it was produced by the CPU, i.e. single cycle storage operation. Unfortunately, the mechanism of the MMU for indicating whether a particular storage operation is invalid is not able to return its result sufficiently early within this single cycle to stop, if necessary, the write operation and so two cycles must be used for each cache storage operation, i.e. the write cycle is not started until it is known that the access is valid. Whilst providing that each cache storage operation should take two clock cycles is a simple and reliable solution, this approach does have a significant impact upon the system performance.

Another approach might be to try to provide that the CPU can issue the address in which an output data word is to be stored sufficiently early within the clock cycle that the check by the MMU as to whether that storage operation is invalid can be made in time to stop a particular data write occurring within the same clock cycle that it is to be issued. Unfortunately, within high speed processors the mechanisms that produce the data address are already operating near their maximum capacity and so it is not practical to produce the data address sufficiently early to allow such an approach to work. Furthermore, if it were possible to produce the data addresses earlier, then it would be most likely that one would seek to reduce the clock period to take advantage of this in all aspects of the processor operation rather than leave the clock period unnecessarily high to deal with the cache storage problem.

A further approach would be the adding of a write buffer between the CPU and the cache memory. Such an approach would require that, if the CPU had issued a write request immediately followed by a read request from the same memory location, then the write buffer rather than the cache memory would hold the data required for the read request and logic would be required to detect and avoid or compensate for this situation. The logic that would be needed is relatively complex and the introduction of such complex logic into the performance critical CPU to cache memory path would be disadvantageous.

A still further approach would be to allow the invalid storage operation to take place within the single processing clock period and then, when the result that the storage operation was invalid became known from the MMU during the next processing clock cycle, initiate action to purge such invalid data from the cache. This could be achieved by providing a "dirty" bit per word of data in the cache to indicate/flag whether that data word was invalid. Thus, a storage operation for a particular output data word would made to the cache and then, in response to a signal produced by the MMU, the data word can, if appropriated, be marked as invalid. A significant problem with this approach is that the provision of a "dirty" bit per word of data in the cache adds a disadvantageous amount to the physical size of the cache.

SUMMARY OF THE INVENTION

It is an object of the invention to provide high speed cache access without incurring the above disadvantages.

Viewed from one aspect this invention provides apparatus for data processing, said apparatus comprising:
  (i) a central processing unit for generating, during a processing clock period, an output data word for storage;
  (ii) a cache memory for storing said output data word during said processing clock period to provide single cycle storage operation, said cache memory having a plurality of cache storage lines, each cache storage line having an associated invalid-line flag and being operable to store a plurality of such output data words;

(iii) memory management means distinct from said central processing unit and said cache memory for generating, during a following clock period subsequent to said processing clock period, an invalid-storage signal, independent of whether a cache hit occurred, indicative of whether storage of said output data word in said cache memory during said processing clock period was an invalid storage operation; and (iv) flag setting means responsive to said invalid-storage signal for setting that invalid-line flags associated with that cache storage lines within which said invalid storage operation has been made.

The invention provides invalid-line flags that each serve to indicate whether the plurality of data words of a cache storage line within the cache memory should be treated as invalid. Thus, if a single output word within a cache storage line is the subject of an invalid storage operation, then the entire cache line will be marked as invalid. Superficially such an approach would appear to be a disadvantage in that more data words than absolutely necessary are marked as invalid and thus rendered non available in the cache requiring a lower speed non-cache operation if they are to be accessed. However, it is surprisingly found in practice that when a single invalid storage operation occurs it is probable that subsequent operation will in any case require/cause that entire cache storage line and many other surrounding cache storage lines to be replaced with different data. Thus, the invalidation of a plurality of data words rather than a single data word in fact causes relatively little performance loss and yet is able to provide a system in which a single clock period can be used for output word generation and storage within the cache memory and yet avoid the complexity of having to provide a write buffer to the cache or the size disadvantages of providing a "dirty" bit for each data word.

It will be appreciated that a cache storage line for storing a plurality of output data words will typically be laid out as a line within the circuit structure, but this is not necessarily the case. The term cache storage line can be considered to signify a set of storage elements that are grouped/associated together in some way. Furthermore, it will be appreciated that the use of a single invalid-line flag to mark invalid storage operations has the additional advantage that the invalid-line flag will typically already be provided with the cache memory system to indicate that particular cache line has at some stage been loaded with valid data from within the other storage elements in the system. Thus, the invalid-line flag may be effectively used for two purposes, i.e. initialisation of the cache and the marking of invalid storage operations within the cache.

In addition to providing the invalid-storage signal, the memory management means may advantageously additionally serve to map a virtual address generated by said central processing unit for storage of said output data word to a physical address.

In order to provide its function of generating the invalid-storage signal, it is convenient to provide that said memory management means includes a cache storage lookup table indicating those physical addresses for which output data words may be validly stored in said cache memory.

Whilst such a cache storage look up table provides a convenient way of indicating whether physical addresses (e.g. display screen map addresses) are not ones in which a valid cache storage operation should be made, this does introduce the problem that the operation of the look up table is not of a sufficient speed to enable the invalid-storage signal to be produced within the processing clock period and so such embodiments are ones in which the mechanism for flagging invalid storage operations during the following clock period are particularly useful.

In an analogous manner, preferred embodiments of the invention are ones in which said central processing unit is operable in a plurality of processing modes; and said memory management means includes a mode lookup table indicating those physical addresses for which output data words may be validly stored when said central processing unit is operating in a given processing mode.

The plurality of processing modes may, for example, take the form of differing processing threads within a multitasking system or the execution of different objects within an object oriented program.

In order to deal with the differing situations that can give rise to an invalid storage operation it is advantageous to provide an OR gate for logically combining outputs of said cache storage lookup table and said mode lookup table to produce said invalid-storage signal.

It will be appreciated that in the high speed processing environment in which this invention operates, by the time at which the invalid-storage signal has been generated, the address of the cache storage line in which the invalid storage operation has taken place may no longer be present on the address bus, as this will by then have moved onto the next processing operation.

In order to deal with this, it is advantageous that said flag setting means comprises:

an address register, for use during said following clock period, for storing data identifying that one of said cache storage lines within which a storage operation has been made during said processing clock cycle; and means, enabled by said invalid-storage signal during said following clock period indicating an invalid storage operation, for setting that one of said invalid-line flags identified by said address register.

Whilst it will be appreciated that the invention may be implemented as discreet circuit components, it will be advantageous that the invention is implemented as an integrated circuit. This is particularly true of providing the cache memory on the same integrated circuit as the central processing unit to provide a sufficiently high speed data path between the two.

Viewed from another aspect this invention provides a method of data processing, said method comprising the steps of:

(i) generating, during a processing clock period, an output data word for storage;

(ii) storing said output data word in a cache memory during said processing clock period to provide single cycle storage operation, said cache memory having a plurality of cache storage lines, each cache storage line having an associated invalid-line flag and being operable to store a plurality of such output data words;

generating, during a following clock period subsequent to said processing clock period, an invalid-storage signal, independent of whether a cache hit occurred, indicative of whether storage of said output data word in said cache memory during said processing clock period was an invalid storage operation; and in response to said invalid-storage signal, setting that invalid-line flags associated with that cache storage lines within which said invalid storage operation has been made.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
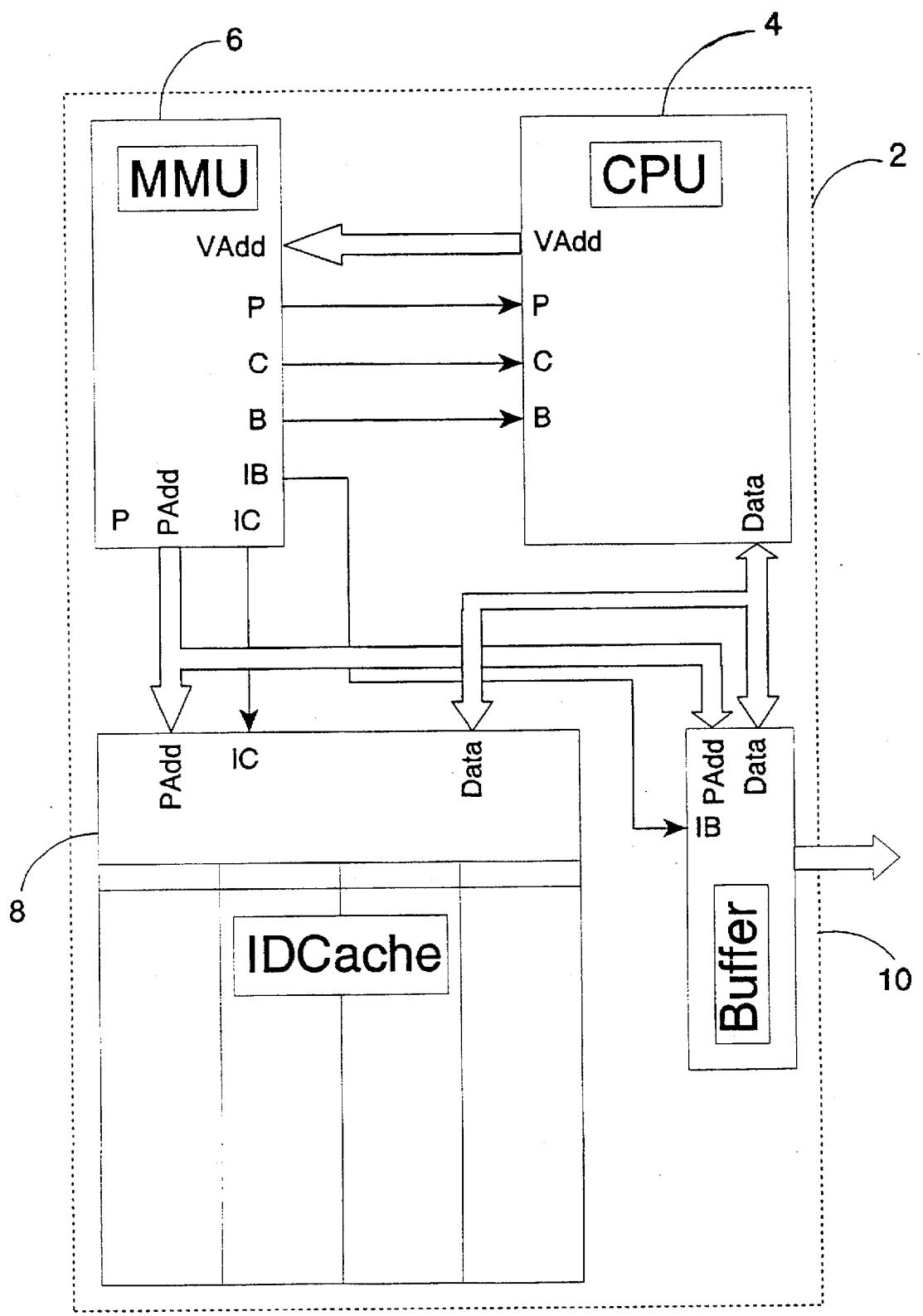
FIG. 1 schematically illustrates the layout and interconnections of an integrated circuit.

FIG. 1 shows an integrated circuit 2 having a CPU 4, a MMU 6, a cache memory 8 and an output buffer 10. A plurality of internal buses links the elements of the integrated circuit 2. It will be appreciated that whilst the MMU 6 is a distinct functional ciruit element from the CPU 4 and the cache memory 8, it is still fabricated as part of the integrated circuit 2.

The internal data buses bear the following signals:

Data—a 32-bit output (Dout) or input (Din) data word from or to the CPU 4 for storage in or recovery from the cache memory 8 or outside the integrated circuit 2 via the buffer 10;

VAdd—a virtual data address for a data word being manipulated by the CPU 4;

PAdd—a physical data address to which the virtual data address is mapped by the MMU 6;

P—a signal produced by the MMU 6 and supplied to the CPU 4 (on a following clock cycle) indicating whether a data address to which write access is being sought by the CPU 4 is available given the processing mode in which the CPU 4 is operating;

B—a signal produced by the MMU 6 and supplied to the CPU 4 (on a following clock cycle) indicating whether an output data word that has been sent to the buffer 10 was in fact appropriate for buffering;

IB—a signal produced by the MMU 6 and supplied to the buffer 10 (on a following clock cycle) indicating whether an invalid buffer storage operation has occurred so that the buffer 10 should be purged of that data;

C—a signal produced by the MMU 6 and supplied to the CPU 4 (on a following clock cycle) indicating whether a data word stored within the cache memory 8 was suitable for such storage; and IC—a signal produced by the MMU 6 and supplied to the cache memory 8 (on a following clock cycle) indicating whether an invalid cache storage operation has taken place so that the cache memory 8 should be purged of that data.

In operation, the CPU 4 produces an output data word, Dout and a virtual address VAdd at which that data word is to be stored. The MMU 6 then translates the virtual address Vadd to a physical address PAdd and performs a lookup operation upon the physical address PAdd to determine whether that address is bufferable, cacheable and whether the CPU 4 should have access to it given its processing mode. The physical address PAdd is produced in the same clock cycle as the output data word Dout and the virtual address Vadd are produced. The other signals from the MMU 6 relating to that storage operation are produced on the following clock cycle.

The cache memory 8 (an instruction and data cache—IDCache) receives the physical address PAdd and the output data word Dout on the same clock cycle that they were generated by the CPU 4 and stores the output data word Dout within the cache if a cache hit for that physical address PAdd is detected.

Should the MMU 6 determine that the cache storage operation is an invalid storage operation, then it produces a signal IC indicative of this which is supplied to the cache memory 8 on the next clock cycle. The signal IC is an invalid-storage signal. The MMU 6 also re-supplies the physical address PAdd to the cache memory 8 upon occurrence of such an invalid storage operation.

The cache memory 8 responds to the signal IC by accessing the cache line or lines (see later) indicated by the physical address PAdd and setting an invalid-storage flag for those cache lines.

In some cases, the physical address PAdd produced by the MMU 6 will indicate that the output data word Dout should be buffered by the buffer 10. If the memory management unit 6 detects during a following clock cycle that this buffering operation was invalid, then the invalid buffer storage signal IB is subsequently asserted and the buffer data purged from the buffer 10.

Figure 2:
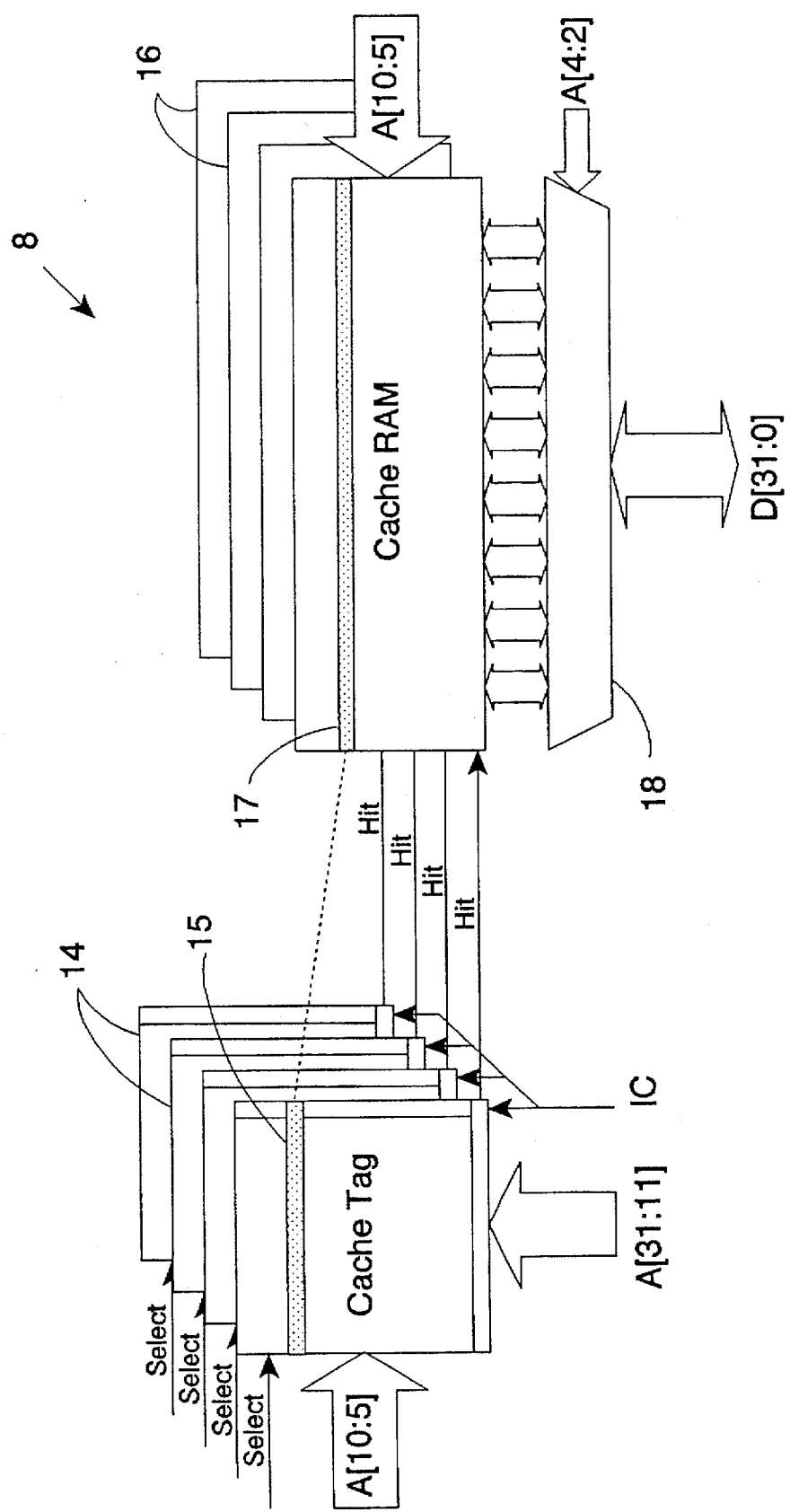
FIG. 2 schematically illustrates a cache memory of the circuit of FIG. 1.

FIG. 2 schematically illustrates the cache memory 8 in more detail. The cache memory 8 contains four cache tag units 14 that serve to detect cache hits. The fifth to tenth bits A[10:5] of the physical address PAdd are used to select a tag line 15 within each of the cache tag units 14, the contents of this tag line 15 being compared with the eleventh to thirty first bits A[31:11] of the physical address PAdd to determine whether an address match indicative of a cache hit has occurred.

If a cache hit has occurred, then this is signalled to the corresponding bank of four cache random access memories (RAMs) 16 via the "Hit" lines. With the appropriate one of the cache RAMs 16 activated, the fifth to tenth bits A[10:5] of the physical address PAdd are again used to address and select one of sixty four cache lines 17 within that cache RAM. The contents of the entire cache line 17 are connected in parallel to a multiplexer 18 using which the appropriate data word of the eight data words stored in the cache line 17 is selected for writing in dependence upon the second to fourth bits A[4:2] of the physical address PAdd.

Each output data word is a 32-bit data word D[31:0] containing four bytes of data. The particular byte to be addressed is indicated by the zeroth and first bit A[1:0] of the physical address PAdd.

The design of the cache memory 8 is such that the address lookup within the cache tag units 14 to detect a cache hit and the selecting and writing of the appropriate cache line 17 in the cache RAMs 16 via the multiplexer 18 occurs within a single clock period.

Reading of data from the cache memory 8 and writing data to the cache memory 8 is a symmetrical operation in that a cache hit is detected in the same way by the cache tag units 14 and it is merely the direction of data flow either to or from the cache RAMs 16 through the multiplexer 18 that varies.

In the circumstance that an invalid storage operation has occurred, this is detected by the time of the following clock period and an invalid-storage signal IC asserted by the MMU 6. The physical address PAdd at which the invalid storage operation occurred will be reasserted to the cache memory 8. Accordingly, the same cache tag lines 15 will be selected by the fifth to tenth bits A[10:5] of the physical address PAdd and the invalid line flags for these set by the invalid-storage signal IC. In order to speed up the operation of this purging action, the invalid-storage flags of the cache tag lines 15 in all four cache tag units 14 matching the fifth to tenth bits A[10:5] are set. It would be possible to set only the single invalid-storage flag of the appropriate cache tag line 15 by waiting until the eleventh to thirty-first bits A[31:11] had been decoded, but this would take a further clock cycle. In practice, it turns out that there is little disadvantage in invalidating all four cache tag lines at once.

Figure 3:
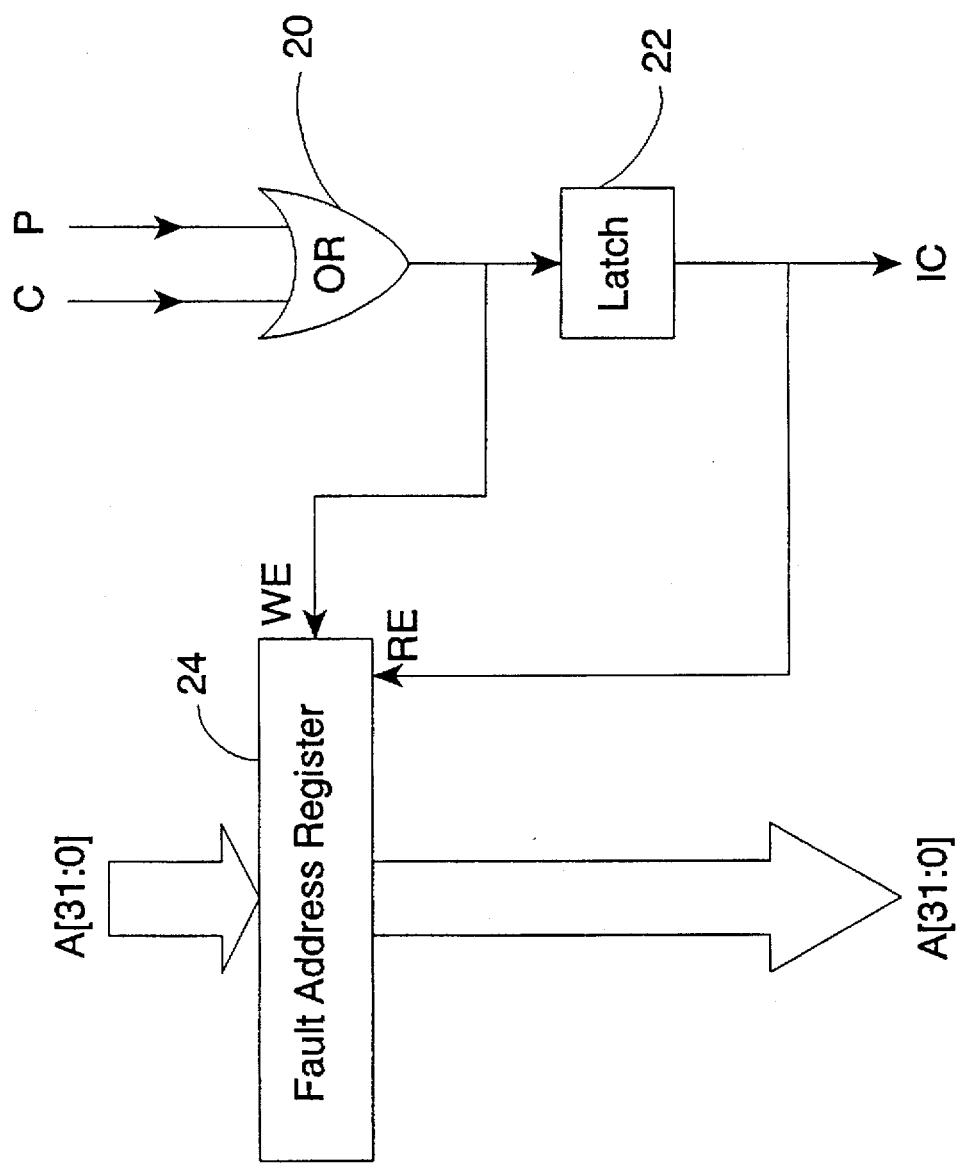
FIG. 3 schematically illustrates a part of a memory management unit of the circuit of FIG. 1.

FIG. 3 illustrates a portion of the MMU 6 responsible for the generation of the invalid-storage signal IC. The signals C and P indicative respectively of whether an output data word is appropriate for storage in the cache memory 8 or appropriate for storage by that particular processing mode are ORed by an OR gate 20. The output from the gate 20 is latched by a latch 22 and also supplied to a fault address register (FAR) 24. The FAR 24 treats the output of the gate 20 as a write enable signal and stores the physical address of the output data word for which it has been indicated than an invalid storage operation has taken place. On the following clock cycle, the latched signal within the latch 22 serves as the invalid-storage signal IC and as a read enable signal to the FAR 24 reasserts the previous physical address PAdd to the cache memory 8 for purging as previously described.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for data processing, said apparatus having the form of a single integrated circuit and comprising:
   (i) a central processing unit driven by a clock signal for generating, during a processing clock period with a duration of one cycle of said clock signal, an output data word for storage;
   (ii) a cache memory for storing said output data word during said processing clock period to provide single cycle storage operation, said cache memory having a plurality of cache banks, each having a plurality of cache storage lines, each cache storage line having an associated invalid-line flag and being operable to store a plurality of such output data words;
   (iii) memory management means distinct from said central processing unit and said cache memory for generating, during a following clock period subsequent to said processing clock period and during which said central processing unit continues operation independently of storage of said output data word, an invalid-storage signal, independent of whether a cache hit occurred, indicative of whether storage of said output data word in said cache memory during said processing clock period was an invalid storage operation; and
   (iv) flag setting means responsive to said invalid-storage signal for setting the invalid-line flags associated with the cache storage line within which said invalid storage operation has been made and the corresponding cache storage lines in the other cache banks.

2. Apparatus as claimed in claim 1, wherein said memory management means maps a virtual address generated by said central processing unit for storage of said output data word to a physical address.

3. Apparatus as claimed in claim 1, wherein said memory management means includes a cache storage lookup table indicating those physical addresses for which output data words may be validly stored in said cache memory.

4. Apparatus as claimed in claim 1, further comprising:
   a cache tag unit associated with each cache bank, the cache tag unit being arranged to store the data addresses of the data words stored in the associated cache bank, and the cache tag unit containing the invalid-line flags for corresponding cache storage lines in the associated cache bank.

5. Apparatus as claimed in claim 1, wherein said flag setting means comprises:
   an address register, for use during said following clock period, for storing data identifying that one of said cache storage lines within which a storage operation has been made during said processing clock cycle; and
   means, enabled by said invalid-storage signal during said following clock period indicating an invalid storage operation, for setting that one of said invalid-line flags identified by said address register and the invalid-line flags for said corresponding cache storage lines in the other cache banks.

6. Apparatus as claimed in claim 1, wherein:
   said central processing unit is operable in a plurality of processing modes; and
   said memory management means includes a mode lookup table indicating those physical addresses for which output data words may be validly stored in said cache memory when said central processing unit is operating in a given processing mode.

7. Apparatus as claimed in claim 6, wherein said memory management means includes a cache storage lookup table indicating those physical addresses for which output data words may be validly stored in said cache memory comprising an OR gate for logically combining outputs of said cache storage lookup table and said mode lookup table to produce said invalid-storage signal.

8. A method of data processing upon a single integrated circuit, said method comprising the steps of:
   (i) generating with a central processing unit an output data word for storage during a processing clock period with a duration of one cycle of a clock signal driving said central processing unit;
   (ii) storing said output data word in a cache memory during said processing clock period to provide single cycle storage operation, said cache memory having a plurality of cache banks, each having a plurality of cache storage lines, each cache storage line having an associated invalid-line flag and being operable to store a plurality of such output data words;
   (iii) generating, during a following clock period subsequent to said processing clock period and during which said central processing unit continues operation independently of storage of said output data word, an invalid-storage signal, independent of whether a cache hit occurred, indicative of whether storage of said output data word in said cache memory during said processing clock period was an invalid storage operation; and
   (iv) in response to said invalid-storage signal, setting the invalid-line flags associated with the cache storage line within which said invalid storage operation has been made and the corresponding cache storage lines in the other cache banks.

* * * * *